Dec. 21, 1954 R. H. RANGER 2,697,754

MAGNETIC SOUND RECORDING

Filed March 31, 1949 4 Sheets-Sheet 1

INVENTOR.
Richard H. Ranger
BY Raphael Yanovet
Attorney

Dec. 21, 1954 R. H. RANGER 2,697,754

MAGNETIC SOUND RECORDING

Filed March 31, 1949 4 Sheets-Sheet 2

INVENTOR.
Richard H. Ranger
BY
Attorney

Dec. 21, 1954 R. H. RANGER 2,697,754

MAGNETIC SOUND RECORDING

Filed March 31, 1949 4 Sheets-Sheet 3

INVENTOR.
Richard H. Ranger
BY Raphael Demoret
Attorney

MAGNETIC SOUND RECORDING

Filed March 31, 1949

4 Sheets-Sheet 4

INVENTOR.
Richard H. Ranger
BY Raphael Semmes
Attorney 2,697,754

Patented Dec. 21, 1954

2,697,754

MAGNETIC SOUND RECORDING

Richard H. Ranger, Newark, N. J.

Application March 31, 1949, Serial No. 84,510

20 Claims. (Cl. 179—100.2)

This invention relates generally to sound moving pictures, and particularly to sound moving picture systems utilizing magnetic tape recordings to provide the sound accompanying the motion pictures. The invention concerns itself particularly with the establishment of synchronism between the motion of the magnetic tape and the motion of the motion picture film, for assuring synchronization of the sound on the tape with the action in the pictures.

The use of magnetic tape recording in the sound motion picture art offers various advantages, provided the difficulty of obtaining precise synchronism between the magnetic tape and the movement of the film can be solved. When sound is recorded directly on a film, photo-processing of the film must be completed before the quality of the recorded sound may be determined, whereas when the sound is recorded on a magnetic tape the sound may be monitored even as it is being recorded, providing assurance that the sound, at least, is correct, while a scene is being played. Thereby, it is possible to avoid having to replay a scene at some future time, with the consequent economic waste, and with the possibility in mind that some scenes are not susceptible of repetition at future times.

Additionally, magnetic tape recording affords advantages of greater frequency range, higher fidelity and less noise, without the use of noise suppression devices, than is the case of photographic recording. Finally, magnetic tape recording is inherently a lower cost recording process than is sound recording on film, both in respect to cost of the equipment involved, and in respect to the cost of the operations required to process the recordings.

The use of magnetic recording on the same film which contains the pictures, by the addition of a thin strip of magnetic material down one edge of the film, either on the front or the back thereof, has been previously suggested. Systems of this character are difficult of practical implementation because of the chemical complications introduced by having magnetic material present in photographic solutions during photo-processing of the film.

The suggestion has further been made that a magnetic track be inserted on motion picture film after the film has been processed. It is found, however, that great difficulties are involved in laying down a smooth narrow strip of magnetic material, without variations in width and in thickness, and, in any event, the process involves recording the sound separately from the film, and thereafter applying the sound to the magnetic material on the film after processing of the film, so that all the problems of synchronization remain, which might have been avoided were the magnetic material provided on the film prior to processing, and the sound recorded while the film was being made. For these reasons, the suggestions briefly recited as known to the prior art are considered to be impractical, and incapable of commercial utilization.

It has further been suggested by those skilled in the art, in order to accomplish synchronous movement of film and magnetic tape, that normal film base stock, on which has been coated magnetic emulsion, instead of the normal photographic emulsion, be utilized as a recording medium. Film of this character could then be utilized in standard motion picture equipment by merely substituting magnetic heads for photographic heads. Such a system is extremely disadvantageous, however, since there is a considerable waste of film involved, in that only a narrow portion of the film width can be used to advantage for recording. A more serious disadvantage resides in the fact that in order to enable provision of perforations in the film a thicker base must be used than is normal in magnetic tape recording, i. e., of the order of five mils as compared with two mils. The use of thin tape, moreover, is extremely desirable since the thinner tape moves over the magnetic head with much greater flexibility and stability, and with less possibility of slap, than does tape having a thicker base. Further, the process of feeding film by means of sprockets involves very real problems as is evidenced by the fact that so many designers claim superior results for their particular sprocket drives. Any irregularities in film movement due to the method of driving the film, or defects of sprocket drive, will give rise to "wows," which correspond with or are responsive to slight changes in speed of a recording medium during reproduction, or during recording, of the sound, resulting in irregular changes in the pitch of the sound which are extremely noticeable and disagreeable.

Still a further approach to the problem of recording sound to accompany motion pictures has been the ultization of markings on the back of a tape, the markings and tape being of such character that the markings may serve as means for modulating a strong light beam focused on the back of the tape, and thence reflected to a photo-cell. Variations of the light serve to generate electrical responses in the photo-cell circuit, which may then be used as a check against a standard frequency, such as the normal power frequency driving the equipment involved, and the speed of the tape may be controlled to maintain the modulations derived from the tape in synchronism with the frequency of the standard frequency. The difficulty with systems of this character is that the control must be exercised both in recording on the tape, and in playing back, whereby extra equipment for both the recording and the reproducing operation are required, and the opportunity for occurrence of "wows" in response to speed variations is doubled. Also, the markings on the tape must get slightly out of step with the standard frequency, in order for the correction circuit to operate, which means that the system inherently involves hunting with respect to the true desired speed. Such hunting, however small, is deleterious in sound recording systems.

Still a further system of sound moving picture production which has been suggested by workers in the art involves recording both the sound and the control frequency on the same type. For this purpose, the normal width of the tape may be divided into two zones, with a guard zone between them. One zone is utilized for recording the normal sound, and the other zone is utilized for recording the control frequency. The control frequency is usually that of the A.-C. power source used for driving the equipment, including both the tape recording machine and the motion picture machine. With this arrangement, it is not necessary, during recording, to provide for better than the normal speed constancy of the tape recording equipment, control of tape speed being exercised only during play-back. A disadvantage of systems of this character resides in the mode of utilizing the tape, the active part of the tape being materially decreased by division of the tape into zones, to enable utilization of a portion of the tape width for recording control frequencies.

It is a broad and comprehensive object of the present invention to provide novel methods and apparatus for synchronizing recordings reproduced from a magnetic tape with feed of motion picture film by a motion picture projector.

It is another object of the present invention to provide a novel method and apparatus for recording two discrete signals simultaneously on a single magnetic tape, and for reproducing the two discrete signals without mutual interference.

It is still another object of the invention to provide a method and apparatus for recording on an elongated magnetic tape a plurality of discrete recordings, one by means of a recording head having a recording gap oriented with its length extending laterally of the magnetic tape and the other by means of a recording head having a recording gap oriented with its length substantially parallel to the length of the elongated magnetic tape.

It is a further object of the invention to provide a method and apparatus for recording two discrete recordings on a single magnetic tape in terms of bound magnetic flux oriented in mutually different directions.

It is a still further object of the invention to provide methods and apparatus for recording two discrete signals on a single magnetic tape, as variations of bound magnetic flux, in one case extending laterally of the tape, and, in the other case, extending longitudinally of the tape, and further to provide a single erasing head for erasing both records simultaneously.

It is a further broad object of the invention to provide a novel system of multiplex recording on a single magnetic tape, wherein a first record is recorded as laterally extending bound magnetic flux and wherein another record is recorded as a pair of oppositely directed bound magnetic fluxes of substantially equal magnitude, which are oriented at a relatively large angle with respect to the orientation of the laterally extending flux.

Still another object of the invention resides in the provision of a novel thyratron inverter capable of providing an output alternating current of controllable frequency in the absence of synchronizing voltage, and which is susceptible of synchronization of suitable control signals.

Another object of the invention resides in the provision of a novel motor control system for controlling the rotative speed of a synchronous capacitor type hysteresis motor by driving the motor from a first source of alternating current, and simultaneously applying this current to the anode-cathode circuit of a thyratron tube which is connected in circuit with at least one of the field windings of the hysteresis motor, and applying a synchronizing voltage between the control grid and cathode of the thyratron to control the average D.-C. current flowing through the thyratron, thereby effecting a braking action on the hysteresis motor which is proportional to the phase difference between the voltages between the anode-cathode and between the grid-cathode of the thyratron.

It is another object of the invention to provide an apparatus for actuating a motion picture projector at a frequency determined by the frequency of control signals recorded on a magentic tape.

It is still another object of the present invention, subsidiary to the last mentioned object, to provide apparatus for initiating actuation of a motion picture projector at a predetermined time during reproduction of a magnetic recording from a magnetic tape, in response to a marker applied at a preselected position of the magnetic tape.

Still another object of the invention resides in the provision of a system for recording sound on magnetic tape and pictures on film, simultaneously, and for thereafter transferring the sound to the film photographically, while maintaining sound and picture synchronism.

A further object of the invention resides in the provision of a system for synchronizing tape recorded background sound with sound recorded in synchronism with motion picture exposure on a magnetic tape, the background sound having been recorded independently of the pictures and of the sound recorded in synchronism with the pictures.

Briefly described, the present invention comprises a complete system of magnetic tape recording of sound to accompany motion picture, wherein the full normal width of the tape is utilized in the normal manner for recording the sound, the recording being accomplished with normal magnetic heads, and without speed control of the tape during recording. At the same time a narrow track is recorded in superimposed relation to the normal sound recording, for control purposes, the latter recording being accomplished in such manner that it does not interfere with the normal sound recording, and so that substantially no cross-talk exists between the normal recording and the control recording. The usual power frequency is 60 cycles per second, and this frequency is, accordingly, a very convenient frequency for utilization as a control frequency. On the other hand, the frequencies involved in high quality sound recording should go well below 60 cycles per second, say to 40 cycles per second at least. The present invention solves the problem of recording a 60 cycle control frequency in superposition to a sound recording which goes to 40 cycles per second, or lower, without mutual interference between the sound signal and the control signal. This is accomplished, in accordance with the present invention, by utilizing the normal recording gap in the sound recording head for normal recordings, that is, by utilizing gaps which extend transversely of the magentic tape, and in utilizing recording gaps for the control recording head which extend longitudinally of the tape, or substantially perpendicularly to the gaps utilized for normal recordings. Thereby the orientation of the magnetic flux bound on the magnetic tape by the magnetic recording heads are mutually perpendicular to one another. Reproduction may be accomplished by reproducing heads having gaps oriented similarly to the gaps in the recording heads. The laterally oriented reproducing gap will then be substantially non-responsive to the longitudinally recorded material, while conversely the longitudinally extending gaps will be substantially non-responsive to the laterally extending recording, and a minimum of cross-talk will exist between the two recordings, despite the fact that they involve identical frequencies.

Having provided a system for recording independently in superposed relation the control and the sound signals, and a system further for reproducing these signals without cross-talk, the control signals may be utilized during reproduction for controlling the speed of the magnetic tape.

In accordance with the present invention, the problem is that of synchronizing the motion of the magnetic tape during play-back with the motion of the film through the motion picture projector, the sound and the pictures having been recorded in precise synchronism. The sound and pictures may be synchronized precisely during playback and projection by utilizing the control signal frequency, as played back, as a source of power to drive the motion picture projector, or to synchronize or control frequency of a source of power which drives the motion picture projector. In accordance with this system, the production of motion pictures is perfectly synchronized with the frequency of the driving power of the motion picture projector. This frequency is derived, essentially, from the magnetic tape, whereon it was recorded simultaneously with the accompanying sound, as a control signal, and since the control signal was synchronized with the motion picture camera while the film was being exposed, by virtue of the fact that the motion picture camera was driven by the same signal as provided the control frequency, it will be clear that the sounds and the pictures will be synchronized perfectly during projection of the pictures and reproduction of the accompanying sound.

The problem of erasing the control signal and the sound recording from the magnetic tape may obviously be accomplished in conventional fashion by utilizing properly oriented erasing heads, separately available for the control signals and for the sound signals, taking account of the differing orientations of the bound fluxes involved. However, in accordance with one feature of the present invention erasure may be accomplished by means of a single erasing head having an erasing gap oriented to make an angle with respect to both recorded fluxes, particularly advantageous angle being one of 30°, although obviously a wide variety of angles are available.

While the recording of the control signal may be accomplished by means of a recording head which is conventional except in respect to its orientation with respect to the tape, a further reduction in cross-talk than is available utilizing conventional heads may be accomplished by means of an improved control signal recording head, utilized in a novel and unconventional system of sound recording of control signals.

Briefly described, the novel recording head referred to provides two recording gaps, which are arranged in parallel orientation, and which provide, respectively, oppositely directed magnetic fluxes in response to a recording signal, the two parallel recording gaps being oriented longitudinally with respect to the magnetic tape. Reproduction may obviously be accomplished by means of a reproducing head which is identical with or similar to the recording head. When, however, the normal reproducing head utilized for reproducing the normal sound, and having a recording gap extending transversely of the magnetic tape, is utilized, equal cross-talk signals of opposite phase are induced into the normal recording head, by the two parallel, oppositely directed, control signal recordings. These signals then balance out completely in the normal reproducing head. Similarly normal transversely extending recordings generate equal and opposite effects on the separate gaps of the control signal head, to provide zero effective response.

While the control signals may be amplified sufficiently for direct drive of a motion picture projector in response thereto, provision is made in accordance with the present invention for a more effective and efficient mode of driving the motion picture projector, and one which provides advantages upon transient or temporary failure of control recordings, such as may occur by temporary loss of a few cycles of power frequency during recording of the control signals or the like. In accordance with this feature of the invention, the motion picture projector is driven from a thyratron inverter, comprising a pair of thyratrons connected in an inverter circuit having a normal frequency of operation approximately equal to the control frequency, and which is susceptible of synchronization in response to the control frequency. Accordingly, so long as control frequency is available the thyratron inverter will provide considerable power at the proper frequency for synchronous operation of the motion picture projector. On the other hand, should there be a temporary cessation of control signals the thyratron inverter will continue to oscillate, and to provide driving signals for the projector of at least approximately the proper frequency. Upon recurrence of the control frequencies, the precise driving frequency will be again attainable at the output of the inverter, and a minimum loss of synchronization will have been suffered.

In motion picture work it frequently becomes necessary to play two sound recordings which have been independently made, one of which constitutes a sound recording, which must be in precise synchronism with the picture, and the other of which involves appropriate musical background or sound effects. In such case, one of the two tapes may be selected as the master tape, and the other tape as well as the motion picture projector may be caused to follow the master tape in accordance with the principles above briefly explained. It is normally preferable, obviously, to utilize the sound recording made simultaneously with the pictures as the master tape. Since in this case the two tapes were not produced in synchronism, it will be insufficient merely to drive the slave tape at the same speed as the master tape, as was the case in simultaneous motion picture projection and sound production, and novel means must be provided, accordingly, for speed control of the slave tape. This is accomplished in accordance with the present invention, by means of a capacitive type hysteresis motor, which is driven by a frequency corresponding with that which drives the projector, and hence which is synchronized with the motion of the master tape. Capacitive type hysteresis motors, while synchronous, provide for some variation of speed with load. In accordance with the present invention, the control signal derivable from the slave tape is utilized to introduce a variable drag on the rotor of the hysteresis motor to reduce the speed of the latter sufficiently to establish synchronization of the master and slave tapes. For this purpose, the slave tape must always tend to be driven, in the absence of the speed reduction effect, at a speed slightly greater than the speed of the master tape.

The novel features which I believe to be characteristic of my invention are set forth with particularity in the appended claims. The invention itself, however, as to both its organization and method, will best be understood by reference to the following detailed description of specific embodiments and features thereof, especially when taken in conjunction with the accompanying drawings, wherein:

Figure 3A:
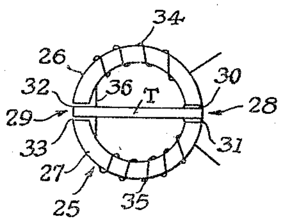
Figures 3B, 3C:
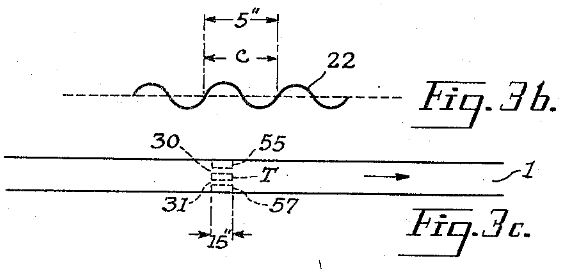
Figure 9:
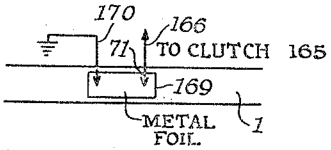
Figure 4:
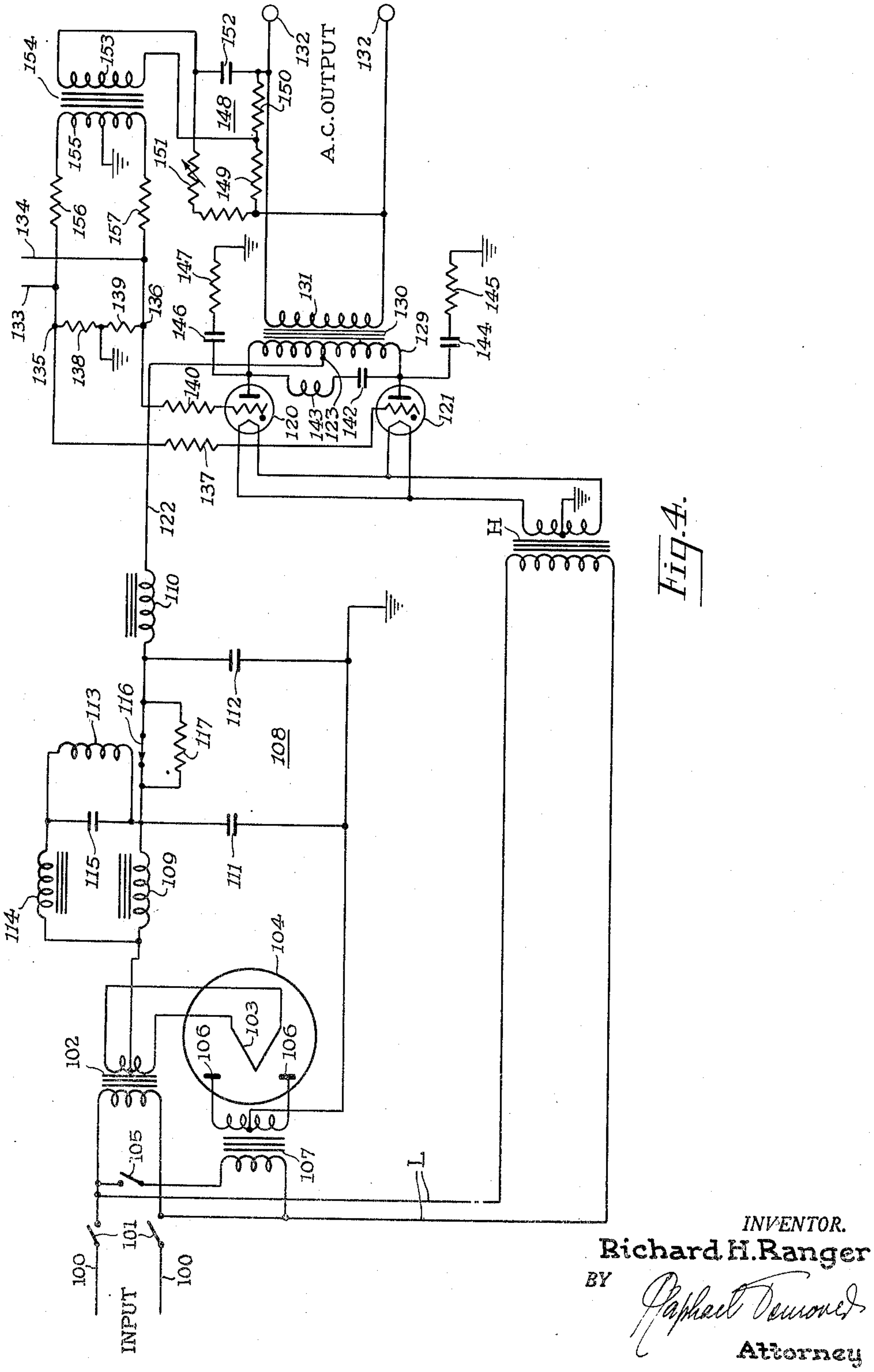
Figure 5:
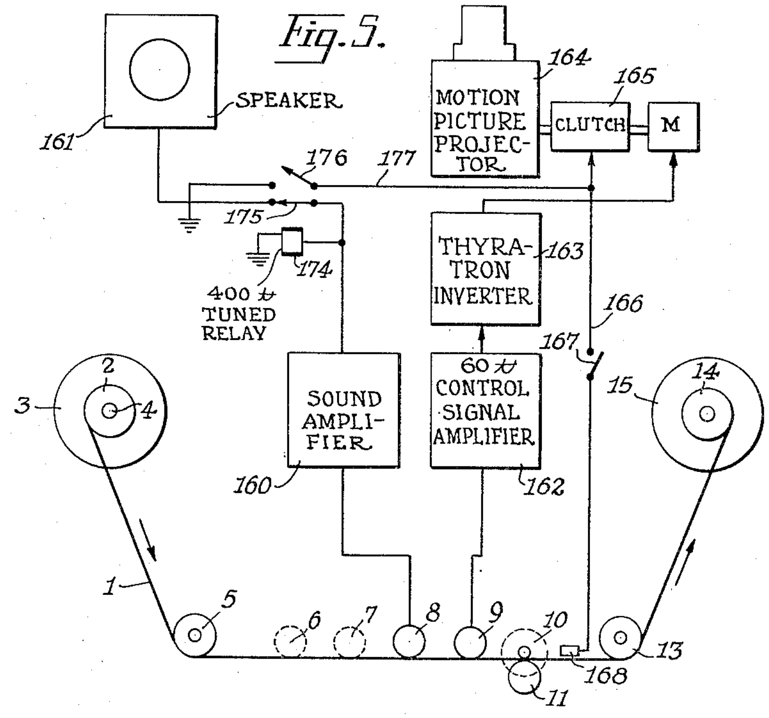
Figure 7:
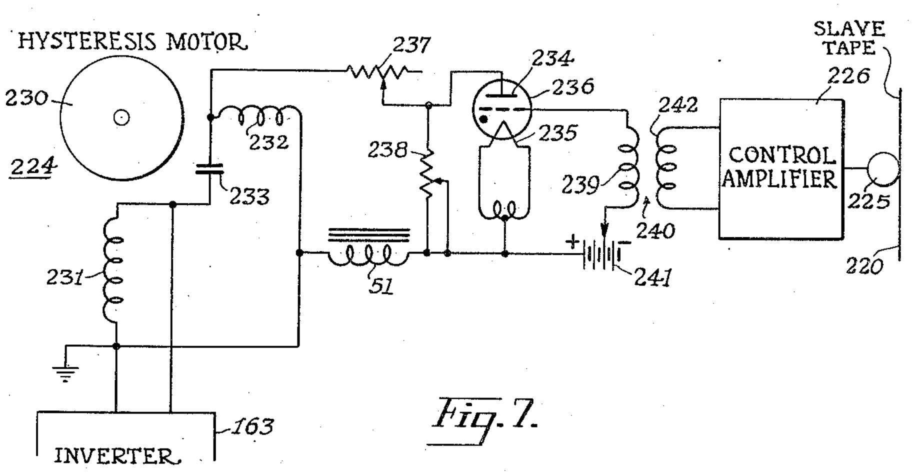
Figure 8:
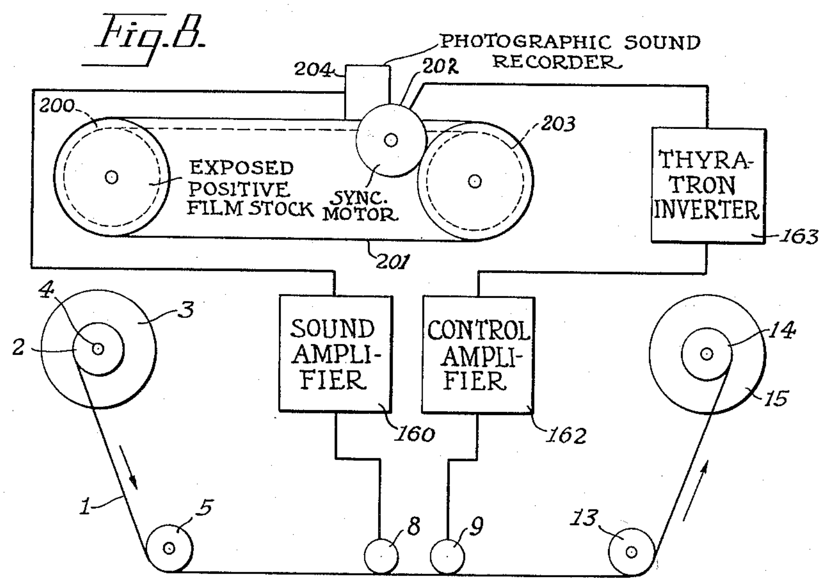
Figure 6:
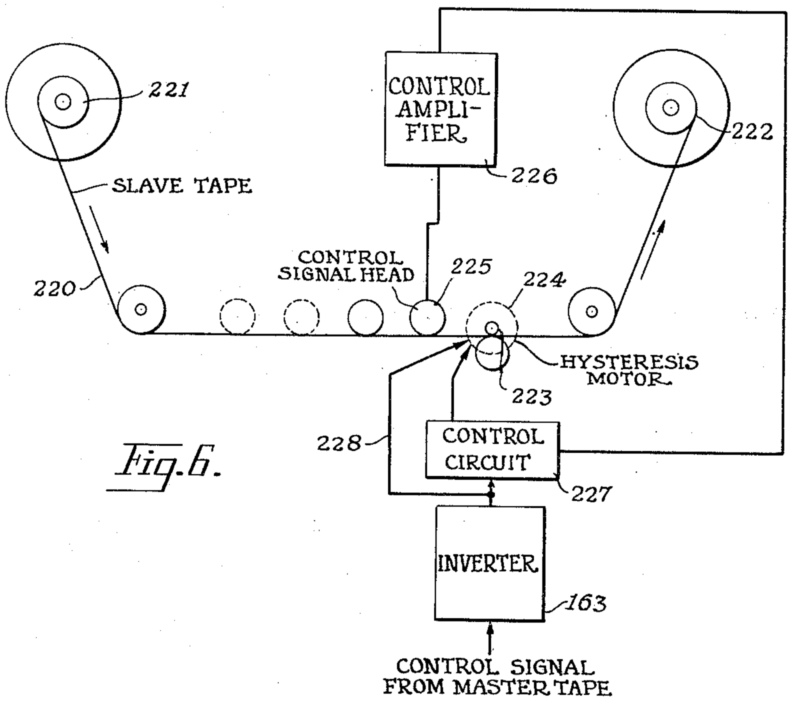

Figure 3*a* is a view in elevation of a recording head for recording a control track, in accordance with a feature of the invention;

Figures 3*b* and 3*c* illustrate certain relationships between recorded frequencies and dimensions of recording gaps, in recording by means of the recording head of Figure 3*a*;

Figure 4 is a schematic circuit diagram of a thyratron inverter, in accordance with the invention;

Figure 5 illustrates, largely in functional block diagram, a system for obtaining initial synchronization between film and magnetic tape in a motion picture system, and for maintaining synchronizism therebetween;

Figure 6 illustrates a system for maintaining synchronism between two tapes by means of a motor control system involving control of slippage of a capacitor type hysteresis motor;

Figure 7 is a schematic circuit diagram of the motor control system of Figure 6;

Figure 8 illustrates a system for transferring sound recordings from a magnetic tape to a sound film;

Figure 9 illustrates a detail of the system of Figure 5; and

Figure 10:
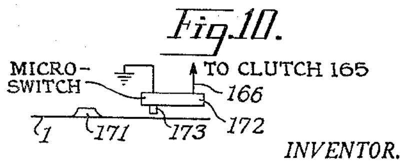

Figure 10 illustrates a modification of the detail of Figure 9.

Figure 1:
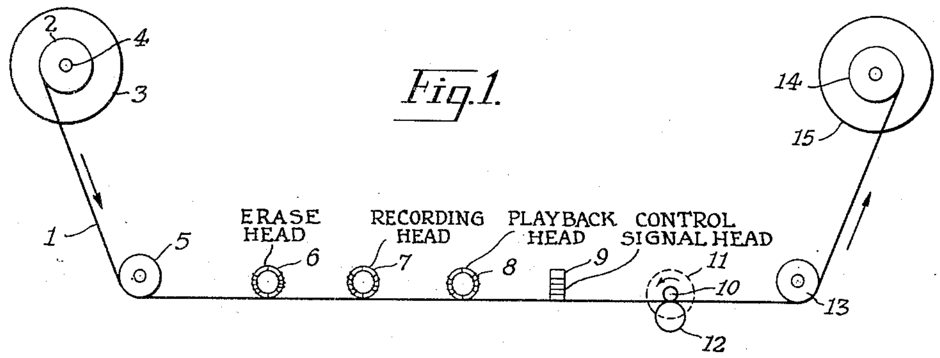
Figure 1 is a conventionalized illustration of a recording and reproducing system.

Reference is now made to Figure 1 of the accompanying drawings, which illustrates a system of sound recording and reproducing which is generally conventional, except for the provision of a control signal recording head, and which illustrates schematically the general organization of a magnetic tape sound recording, erasing and reproducing system.

The system involves generally a roll 2 of magnetic tape 1, supported on a platen 3 which revolves on a shaft 4. Some means of braking the shaft 4 is provided, so that shaft 4 drags on the tape 1, and maintains the latter taut. Since, however, various means for accomplishing the braking function are known in the art, no specific device for this purpose is described or illustrated. The tape 1 passes around a fly wheel idler 5 and then across the gaps in the various magnet heads 6, 7, 8 and 9, and first across the gap in the erase head 6, which serves to prepare the tape 1 for subsequent recordings by erasing therefrom all previously established recordings. Thereafter the tape 1 passes under the recording head 7, which records sounds thereon, in the form of bound magnetic flux. Thereafter the tape passes under the play-back head 8, which may be utilized during recording for monitoring the quality of the recording, and which may be further utilized during reproduction of the sound subsequent to the recording operation. Following the play-back head the tape 1 passes under the control signal head 9, which impresses control signals on the tape, in a manner hereinafter to be described in detail, for the purpose of enabling synchronization of the tape with a motion picture projector, or with a further tape. The tape is pulled from the roll 2, and under the magnetic heads 6, 7, 8 and 9, by means of a capstan 10, which is in turn driven by the synchronous motor 11, shown in dotted outline in Figure 1 of the drawings. A rubber idler wheel 12 is utilized to press the tape 1 against the capstan 10, to insure a firm grip of the latter on the tape 1, and consequent uniformity of tape drive. The tape then passes around an idler roller 13, onto a take-up roll 14, mounted on a platen 15, which may be driven by a capacitor start motor (not illustrated).

While Figure 1 of the drawings illustrates the general organization of a generally conventional sound recording and reproducing system, the system of Figure 1 may be constructed and arranged to comprise features of the present invention by the provision of suitable designs and arrangements for the recording head 7, the erasing head 6, the play-back head 8 and the control signal head 9.

Figure 2:
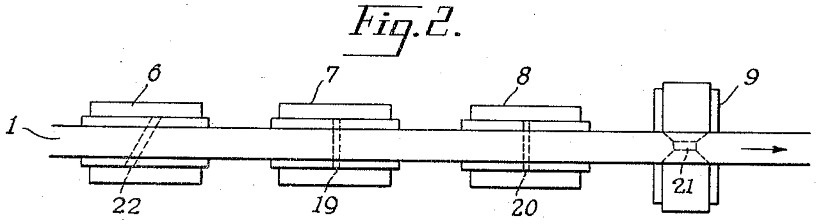
Figure 2 illustrates the orientations of erasing recording and reproducing heads in the system of Figure 1, and in accordance with a feature of the invention.

Reference is made, accordingly, to Figure 2 of the drawings, wherein the arrangement and construction of the magnetic heads above referred to, in accordance with the present invention, is illustrated in detail, the tape 1 being shown in plan view, and being assumed to be in motion from left to right, as viewed in the drawings. The usual magnetic head consists of a toroidal core of magnetic material, split diametrically into halves, and having magnetic coils wound on each half. The toroidal core is provided, at one point, with a transverse gap, and the gap in the toroid may be filled with a shim of beryllium copper, having approximately the same hardness as the metal laminations of which the toroid is normally constructed. This insures equal wear of the toroid material and of the gap material, when the recording gap is brought to bear against the passing magnetic tape to effect transfer to the latter of bound magnetic flux during the erasing or recording processes, and to effect induction in the coil of the toroid of a voltage in response to passage of the gaps over varying bound flux on the tape.

Sound recording in accordance with the present invention is accomplished by a magnetic head 7, which may be of conventional character, and comprises a gap 19 extending completely transversely across the magnetic tape 2. The current corresponding with sounds which are to be recorded are impressed on the coil of the toroid 7, and effect variations of magnetic flux in the gap 19, which are transferred to the magnetic material of the tape 2. Recorded magnetic fluxes may then be translated into variations of voltage, in the play-back head 8, which is provided with a gap 20 similar to the gap 19. Accordingly, recording and play-back of sound, in accordance with the present system, is of conventional character, per se.

The control signal recording head 9, on the other hand, involves novel structure, arranged in accordance with the present invention, particularly in that the head 9 is oriented substantially at right angles to the heads 7 and 8, and comprises a recording gap 21 oriented at right angles to the recording gaps 19 and 20. Accordingly, the magnetic flux impressed on the tape 1, as it moves by the recording gap 21, is of essentially different character than the flux recorded by the gap 19, and is of such character that it induces substantially no variations of magnetic flux in the gaps 19, 20, and hence no voltages in the coils of head 7 and head 8, during play-back or otherwise. Similarly, the flux recorded on the tape 1 by the gap 19 is so oriented with respect to the gap 21 as to induce no voltage in the coil of the toroid 9, since when the head 9 is utilized for reproducing control signals, the flux recorded by the recording gap 19 introduces substantially no variation of flux magnitude across the gap 21. Accordingly, the present system provides for the recording in superposed relation of two records, which may contain identical frequencies, and which may, nevertheless, be reproduced substantially without mutual interference or cross-talk.

Erasure of the records provided by the gaps 19 and 21 may obviously be accomplished by erasing heads oriented in accordance with the flux orientations. In accordance with the present invention, however, an erasing head 6 is provided, which makes an angle respectively with both gap 19 and gap 21, and which, accordingly, provides a component of erasing flux parallel to the flux provided by the gap 21, and a further component parallel to the flux provided by the gap 19, thereby erasing both fluxes simultaneously in a single operation and by a single erasing head.

It has been found in practice that if the head 9 is oriented very carefully with respect to the head 7, an optimum position may be found, where minimum cross-talk occurs, and especially where minimum cross-talk of the control signals on the normal sound recording exists, this cross-talk being down some 50 db from the normal recording. Cross-talk is reduced further by maintaining the gap 21 as narrow as possible, in order to assure that the direction of the flux components impressed on the tape 1 by the head 9 is all the same, and involves as little end effect as possible. For this purpose a gap having a width of approximately half a mil is recommended.

Since the gap 21 extends longitudinally of the tape 1, any given elementary area of the tape has established thereon a flux which varies as this elementary area passes from one end of the gap 21 to the other, as the magnetic flux established in the gap 21 varies during traverse of the tape 1 along the gap 21. This phenomenon may best be explained by reference to Figures 3*b* and 3*c* of the drawings. It should be understood, in the first place, that for top quality sound recording, which is utilized in connection with motion pictures, a tape speed of 30 inches a second is recommended as optimum. Since the normal power source has a frequency of 60 cycles a second, this means that the tape will advance .5 inches during each cycle of the power frequency. If then the length of gap 21 were .5 inches, an elemental area of the tape 1, in passing along the gap 21, would be subjected to a complete cycle of the signal frequency, and the magnetization of the elemental area as it enters the gap 21 and as it leaves the gap 21 would not, in general, be radically changed.

Repeating, the elemental area would be subject in succession to all the values of flux contained in the wave form 22, in succession, so that the tapes would, in net, receive only residual magnetic fluxes. If the length of the gap 21 be reduced .25 inches, it is found in practice that this is still too long, and a length of .15 inches has been found to represent a satisfactory compromise.

An alternative construction of the control frequency recording head 9 is illustrated in Figure 3*a* of the drawings, wherein a magnetic head, 25, is illustrated, consisting of a pair of two ended magnetic circuit segments 26, 27, each generally of semi-circular contour, and having corresponding ends of each of the segments arranged in juxtaposition to form a pair of air gaps, 28, 29. There is provided a tongue or magnetic bridging member, T, which extends between and into the gaps 28, 29, being slightly separated from the end surfaces of the magnetic circuit segments 26, 27, to provide, between one pair of adjacent end surfaces, air gaps 30, 31, and between the other air gaps 32, 33, each pair of air gaps separated by the tongue or bridging member T. A winding 34 is provided on the segment 26, and a corresponding winding 35 on the magnetic circuit segment 27. The windings 34, 35 are connected in series by lead 36, but are oppositely wound, so as to produce magnetic fluxes in identical directions from segments 26 and 27 respectively, into the tongue T. The air gaps 30 and 31, existing between the ends of the magnetic circuit segments 26, 27 and the tongue T, are filled by beryllium copper shims, in a manner well known per se. The directions of the fluxes in the air gaps 30, 31, are, due to the mode of winding and interconnecting coils 34, 35, oppositely directed at all times, or, otherwise expressed, are 180° out of phase.

The recording head 25, illustrated in Figure 3*a* of the drawings, provides then a pair of parallel longitudinally extending recordings having oppositely directed and equal fluxes, at any point taken longitudinally of the tape. The play-back head 8, with its gap 20, in passing over flux of this character, has induced therein equal and oppositely directed voltages deriving from the parallel recordings, generated by gaps 30, 31, respectively, and these voltages balance out to reduce still further the in any event extremely slight cross-talk which may be otherwise introduced by the type of recording produced by head 9.

When a head such as illustrated in Figure 3*a* of the drawings is utilized for reproducing the type of magnetic recording recorded by itself, however, the total effect is an increase in volume of the recording, since both recordings independently produce a voltage in the coils 34, 35, which are additive at all times. At the same time, the play-back head 25, in traversing the type of recording produced by the recording head 7, to the extent that any voltage is induced, picks up variations of magnetic flux which are equal and identically directed in the gaps 30 and 31, respectively, so that the voltages induced in the coils 34, 35 are of opposite phase in response to such flux variations at the gaps 30, 31, and balance out. Accordingly, utilization of a recording head 25, as illustrated in Figure 3*a* of the drawings, results in decreased cross-talk from the head 7, to the head 25, or vice-versa.

It is now necessary to consider the effect of varying widths of the gaps in the head 25 during play-back. If the tape 1 could be made to pass across the head 25 precisely in the same line, while recording and while playing back, the gap width of the recording head and of the play-back head could be identical. Generally speaking, however, this is not possible. Accordingly, for best results the width of the gaps 30, 31 should be greater in a play-back head than in a recording head, thus allowing for lateral movement of the tape 1, or for lateral discrepancy between the position of the tape 1 during recording and play-back. It has been found in practice, with constructions of the character described and illustrated, that a play-back gap width of 2 mils is satisfactory, in general. Accordingly, unless means are provided for varying the gaps 30, 31, during play-back and during recording, it is advisable from a practical point of view, that different heads be used for recording and play-back. Since, as a practical matter, the same machine will seldom be used for playing back with pictures, as is utilized in providing the original sound in conjunction with the camera during taking of the original motion picture, this presents no difficulty.

In constructing heads of the type illustrated in Figure 3*a*, the width of the tongue T should be varied, when the width of the gaps 30, 31, are varied to keep the recorded signals within the larger gaps. This means that the tongue T should be decreased in width as the gap widths are increased. If the gaps are increased from .5 mil to 2 mils, the vertical dimension of the tongue T should be decreased by 1.5 mils. A width of 14 mils is recommended for the tongue T, in recording, and a width of 12.5 mils in play-back.

To erase a double recorded tape, of the type provided by the recording head of Figure 3*a*, a recording head 6 with an inclined erasing gap 22, as illustrated in Figure 2 of the drawings, is satisfactory. While the angle which the gap 22 makes with the tape 1 is not critical, it has been found that an angle of 60° with the direction of motion of the tape is a satisfactory compromise. This reduces the spread over which the tape must contact the head, to assure that the erasure takes place over the entire width of the tape, and nevertheless, provides a maximum erasing magnetic flux in the direction suitable for erasing the true sound recordings, which are, in general, more apt to have intense or high amplitude portions than is the control frequency recording, the latter being generally of constant value over considerable periods of time.

As has been pointed out hereinbefore, the control frequencies, at 60 cycles, after being reproduced from the magnetic tape 1, are utilized to synchronize a thyratron inverter, illustrated in schematic circuit diagram in Figure 4 of the accompanying drawings. While thyratron inverters are, in general, well known in the art, the thyratron inverter which I employ in the present invention comprises various novel features, which are advantageous in the practice of the invention, as well as per se.

Referring now more particularly to Figure 4 of the drawings, the inverter operates from conventional 60 cycles power source, available at the line 100. Closure of the switch 101 energizes the transformer 102, which, in turn, heats the filament 103 of a conventional double diode rectifier tube 104. After the filament 103 has been permitted to attain its operating temperature, a further switch 105 may be closed, either manually, or by means of an automatically operating time delay relay, (not shown) the closure of the switch 105 applying anode voltage to the anodes 106 of the double diode 104, via the anode transformer 107, in push-pull relation.

The pulsating voltage derived from the rectifier tube 104 is filtered by means of a conventional filtering arrangement, generally identified by the reference numeral 108, and comprising series connected chokes 109, 110, and parallel condensers 111 and 112. Shunting the choke 109 is a series connected relay coil 113 and choke 114, the relay coil 113 having connected in parallel to itself a smoothing condenser 115, in accordance with the usual practice. The relay coil 113 operates to open normally closed switch 116, the switch 116 being shunted by a relatively high resistance 117. The relay coil 113 is arranged to pass relatively small current during normal operation of the system, and, in fact, insufficient current to actuate the switch 116 to open position. Should the system draw abnormal currents, however, the relay coil 113 opens the switch 116, placing the resistance 117 in series with the positive lead of the power supply, thereby reducing the current drawn to a relatively low, safe, value. The power supply is utilized to energize a pair of thyratrons, 120 and 121, which form an essential part of the thyratron inverter, and which draw a predetermined current during normal operation of the thyratron inverter. Should the thyratron inverter cease to oscillate, the thyratrons 120 and 121 draw abnormally high current, sufficient to effect destruction thereof. Relay 113 then, in conjunction with switch 116, acts as a protective relay for the system, to prevent burning out of the thyratrons 120, 121.

The high D.-C. voltage output of the filter circuit 108 is applied over lead 122 to the center tap 123 of the primary winding 129 of an output transformer 130 of the inverter, to the secondary winding 131 of which are connected A.-C. output terminals 132. The ends of primary winding 129 of transformer 130 are connected respectively to the anodes of the thyratrons 120 and 121. The cathodes of the thyratrons 120 and 121 are energized in parallel over a heating transformer H, the center of the secondary winding of which is grounded, effectively to ground the cathodes. The transformer H is energized via a line L, which is connected to the power line 100 at a point such that the transformer H becomes energized only upon closure of the switch 101, i. e. upon energization of filament 103.

Synchronizing voltage is applied to the inverter in push-pull relation, to the control electrodes of the thyratrons 120 and 121, over leads 133 and 134, the lead 133 being connected to one terminal 135 of a resistance 138, the remaining terminal of which is connected to ground, and the terminal 135 being connected via a protective resistance 137 to the control electrode of the thyratron 121. Similarly, the lead 134 is connected to one terminal 136 of a resistance 139, the remaining terminal of which is grounded, and the terminal 136 is connected via a protective resistance 140 to the control electrode of the thyratron 120. The thyratrons 120 and 121 are fired in alternation, in response to signals applied thereto by the leads 133, 134, and appearing between ground and the grids of the thyratrons 120 and 121, since the signals are impressed across grid to ground resistances 138 and 139 respectively.

The usual cross-over condenser 142 is provided, which is connected between the anodes of the thyratrons 120 and 121 to effect reduction of the anode voltage of each thyratron in response to firing of the other, in accordance with the normal operation of thyratron inverters. It has been found that cross-over is too violent when the condenser 142 is connected directly between the anodes, and for this reason a cushioning circuit is introduced, consisting of a high frequency choke 143 connected in series with the condenser 142 between the anodes of the thyratrons 120 and 121, as well as side R.-C. branches comprising a condenser 144 in series with a resistance 145, which connects the anode of the thyratron 121 to ground, a similar condenser 146 in series with a resistor 147 connecting the anode of the thyratron 120 to ground. The side R.-C. branches serve to reduce the rate of rise, as well as the amplitude, of the voltages transferred from one anode to the other during cross-over, resulting in a more gradual and less violent cross-over than is otherwise the case.

The A.-C. output voltage available across the terminals 132 is fed back to the grids of the thyratrons 120 and 121 via a phase shifting circuit 148, consisting of a pair of series connected resistors 149, 150, which are connected across the terminals 132, and a resistance of variable value, 151, connected in series with a condenser 152, which are likewise connected across the terminals 132. The junction point of resistances 149, 150, and of condenser 152 and variable resistance 151, are connected across the primary winding 153 of a feed-back transformer 154. There is, accordingly, applied to the primary winding 153 of the transformer 154 an A.-C. voltage having the frequency of the output of the inverter 131, and having a phase determined by the relative values of the resistor 151 and the condenser 152, and which is, therefore, subject to variation as the resistor 151 is varied in magnitude. The secondary winding 155 of the transformer 154 is center tapped, and its terminals are connected to the junction points 135 and 136 via decoupling resistors 156 and 157, respectively. The decoupling resistors 156 and 157 serve to limit back current flow in the secondary winding 155, due to voltage appearing across the leads 133, 134, and, further, to limit voltage at the control electrodes of the thyratrons 120 and 121, due to voltage appearing across the secondary 155, to a value such that synchronizing signals available over the leads 133 and 134 may over-ride the voltage applied by the secondary winding 155, and assume control of the circuit whenever they are present. In the absence of synchronizing voltage on the leads 133 and 134, which may occur for relatively short periods, inadvertently, fed back energy available on the secondary winding 155 of the transformer 154 is sufficient to maintain the inverter in an oscillating state, and accordingly to continue the availability of A.-C. output thereof on the terminals 132, substantially at the same frequency as is established by the synchronizing voltages. The frequency of the inverter in the absence of synchronizing voltage is established primarily by the phase shift introduced by the resistor 151 and the associated condenser 152, and, accordingly, may be established or varied by varying the resistance 151.

Reference is now made to Figure 5 of the accompanying drawings which illustrates in block diagram a system in accordance with the present invention, operating to play back a sound recording in synchronism with projection of a motion picture film.

The recording and reproducing mechanism of Figure 5 follows closely the system illustrated in Figure 1 of the drawings, and has been explained fully hereinabove, and the numerals of reference in Figures 1 and 5 identify similar elements of the invention. It must be assumed that a record has been prepared on tape 1, synchronously with exposure of film, and that prior to play-back the recorded tape has been rewound, and is available on the spool 2, and that the erasing head 6 is de-energized during play-back, as is also the recording head 7. The sound recorded on the tape 1 is translated by the play-back head 8, amplified in a sound amplifier 160, and reproduced over a loud speaker 161. It should be noted particularly that this operation requires no control of speed of the tape 1. Control signal head 9 translates the control signals present on the tape 1, in a manner hereinbefore explained in detail, into electrical signals of frequency corresponding to the frequency of the control recording and impresses these signals on the input of a control signal amplifier 162, which may be peaked to the control frequency. The output of the control signal amplifier 162 is applied to synchronize the output of the thyratron inverter 163, which may be identical with the thyratron inverter illustrated in Figure 4 of the drawings, and explained in detail hereinabove. The output of the thyratron inverter corresponds, then, to a signal corresponding in frequency to that translated by the control signal play-back head 9, but of very considerable magnitude. The output of the thyratron inverter 163 is applied to drive the motion picture projector 164, serving, then, as a power source for the latter, and drives the latter in precise synchronism with the reproduced sound.

To insure simultaneous start of the tape and of the motion pictures, the clap-stick method of motion picture technique may be used. It is very easy to locate the clap on the tape and to mark the back of the tape correspondingly. The developed film is also marked for the clap-stick, and this reference is then used to step forward both tape and film to eliminate the clap-stick and arrive at the start of the action. This stepping forward must, of course, be done on a time basis, allowing 30 inches per second for travel of the tape and 24 frames per second, usually, for travel of the film. By this method, the sound tape and the film may be edited and initially synchronized, and once initial synchronization has been attained the operation of the system illustrated and described will maintain that synchronism throughout reproduction of the sound moving picture.

While the system described immediately above is quite practical, and may be utilized, it is preferable to provide automatic mechanism for initiating feed of film through the motion picture projector 164 at a point in the reproduction of sound from the tape 1 such that synchronism will be established automatically, for maintenance thereafter by the system of the invention. To this end the motion picture projector 164 may be driven via a clutch 165, which serves normally to decouple the motion picture projector from its drive motor M. The clutch 165 is of such character that in response to an electrical control signal it will engage the synchronous drive motor of the motion picture projector to the film advancing mechanism thereof, and will thereafter maintain such engagement.

Accordingly, in the system illustrated in Figure 5 of the drawings the drive motor M of the motion picture projector is energized upon initiation of feed of the tape 1, but is incapable of actuating the film advancing mechanism of the projector 164, since the clutch 165 is normally disengaged. The clutch 165, as has been explained hereinbefore, may be of such character that it engages permanently in response to an electric signal, which may correspond with temporary grounding of a lead 166. The grounding of the lead 166 may be accomplished in various different modes, all of which fall within the purview of the present invention, and which may be used alternatively. Lead 166 may be provided, for this purpose, with a manual switch 167, which connects the lead 166 with a device 168, the device 168 serving, in turn, when properly actuated, for grounding the lead 166 when the switch 167 is closed. Two different embodiments of the device 168 are illustrated in Figures 9 and 10 of the drawings respectively, while the system for energizing clutch 165 is illustrated in Figure 5 itself.

Referring first to Figure 9 of the drawings, there is shown a magnetic tape 1, in plan view, to which has been cemented a foil strip 169, at a point on the tape such that initiation of film feed is to be initiated. A pair of contacts 170 and 171 is provided, the contact 170 being stationary and grounded, and the contact 71 being stationary and connected to the lead 166. These contacts are normally maintained either just out of contact with the tape 1, or pressing very softly thereon. Upon passage of the foil 169 under the contacts 71 and 170, simultaneously, the contacts are bridged by the foil, and ground potential is transferred to the lead 166, in response to which the clutch 165 engaged.

An alternate construction is shown in Figure 10 of the drawings, to which reference is now made. In the embodiment of Figure 10 of the drawings, the tape 1 is shown in elevation. Cemented to the surface of the tape 1 is a projection 171, which passes in juxtaposition to a micro-switch 172 having a movable contact 173. Upon passage of the projection 171 under the micro-switch 172 the movable contact 173 is raised, closing the switch temporarily, and conveying ground to the lead 166, for engaging the clutch 165.

As still another possible mode of controlling engagement of the clutch 165 when the tape 1 arrives at a predetermined position in its travel, a 400 cycle note may be recorded on a portion of the tape 1, selected such that upon traverse of this portion of the tape 1 under the reproducing head 8 (Figure 5) initiation of film feed is to be initiated. The 400 cycle note is picked up by the reproducing head 8, amplified in the sound amplifier 160, and passed to the tuned relay 174, which is tuned precisely to 400 cycles. The relay, when energized, actuates a pair of contacts, the first of which, 175, is normally closed, and when closed connects the sound amplifier 160 to the speaker 161. Upon initiation of the 400 cycle note, reproduction of the 400 cycle note by the play-back 8 opens the switch 175 and prevents reproduction of the 400 cycle note by the speaker 161. Simultaneously, the tuned relay 174, when energized, closes the normally open switch 176, which transfers ground over the lead 177 to the clutch 165, and, accordingly, causes engagement of the latter. After the 400 cycle note recorded on tape 1 has passed the reproducing head 8 the relay 174 is de-energized, whereupon switch 175 re-closes, re-connecting the speaker 161 to the sound amplifier 160.

It is the considered opinion of applicant that magnetic tape recording and reproducing will be initially utilized in the sound motion picture art as an intermediate step in the process of making motion pictures, since present distribution facilities of sound pictures are all built around the use of sound tracks on the motion picture films. The utilization of tape recording will, however, provide all the advantages hereinbefore described, in improving quality, and lowering costs, in the process of film production, despite the fact that the finally produced film may contain sound recorded thereon photographically. In accordance with this feature of my invention, an intermediate step in the process of sound motion picture film production consists in combining sound from a magnetic tape with pictures from a film negative to produce the final print. A system of this character is illustrated in Figure 8 of the accompanying drawing, and reference is now made thereto.

It may be assumed that the film negative will first be printed on positive film, and that the latter has been stored in box 201. A synchronous motor 202 is provided for pulling the film 200, via the usual sprocket drive, onto a take up roll 203, the motion of the film being then locked with the rotation of the synchronous motor 202. The sound from the tape 1 is translated by the play-back head 8, amplified in the sound amplifier 160, and applied to a photographic sound recorder 204, which impresses a sound record on the film 200 duplicating that reproduced or translated by the play-back head 8.

Synchronization of motion of the tape 1 and of the film 200 is accomplished in response to control signals translated by the control signal head 9, which translates the 60 cycle per second control signal present on the tape 1. These signals may be amplified by the control amplifier 162, and then applied to control the frequency of output of the thyratron inverter 163. The output of the thyratron inverter 163 may then be applied to drive the synchronous motor 202. It will be evident that any of the various systems described hereinbefore in connection with Figure 5 of the drawings, for starting motion of the tape 200 at a proper point of the travel of the tape 1, may be utilized, in the practice of the invention illustrated in Figure 8 of the drawings. It will be evident, since the magnetic tape and the film are driven in complete synchronism during play-back of the tape, and since the magnetic recordings were originally recorded in complete synchronism with film exposure, that when the magnetic recordings are translated into photographic recordings on the film by means of the system disclosed, the photographic recordings will be in complete synchronism with the action on the film.

It is frequently desirable, in producing sound to accompany motion pictures, to utilize the composites of two or more recordings. For example, it may be desired to establish a musical background for dialogue, or background sound effects may be desired simultaneously with dialogue. In such cases it is not usual to require absolute lip synchronization between the projected pictures and the background. Accordingly, I disclose a system herein wherein a slave tape, on which is provided background music, sound effects, or the like, may be synchronized with a master tape, on which is recorded dialogue which was taken at the same time as the pictures. The general organization of a system of this character is illustrated in functional block diagram in Figure 6 of the accompanying drawings, Figure 7 of the accompanying drawings illustrating, in schematic circuit diagram, the control circuit for a synchronous capacitive hysteresis motor utilized for driving the slave tape of the system of Figure 6.

Referring now to the system illustrated in Figure 6 of the drawings, a slave tape 220 is provided, which is fed from a roll 221 to a take up roll 222, via a capstan 223, the latter being driven by a motor 224, which may be, specifically, of the capacitive hysteresis type, and, hence, is a synchronous motor which is subject to small variations of speed in response to variations of torque or load.

The reference numeral 225 represents a control signal play-back head, which plays back 60 cycle per second control signals present on the tape 220, and which, in structure, may be identical with the head 9 of Figure 2 of the drawings, or the head 25 of Figure 3*a* of the drawings. The 60 cycle control signal translated by the control signal play-back head 225 may be amplified in a control amplifier 226, and the amplified output of the control amplifier 226 applied to a control circuit 227, to which is also applied output from the thyratron inverter 163. The latter may be identical with the thyratron inverter illustrated in Figure 4 of the accompanying drawings, and described in the descriptive material complementary to that figure. The motor 224 itself may be driven, primarily, from the output of the inverter 163 via the lead 228. The control circuit 227, which performs ultimately a speed control function with respect to motor 224, performs proximately, the function of combining output from the control amplifier 226 and output from the inverter 163, and for developing a control signal therefrom which may be applied to the hysteresis motor 224 for the purpose of establishing a controlled load thereon, which, in turn, serves to vary the speed of the motor 224 sufficiently to establish synchronism of motion of the tape 220, with motion of the master tape 1 which provides the control or synchronization signal for the inverter 163. Since the maximum speed hysteresis motor 224 may attain is its synchronous speed, the capstan 223 is arranged to rotate at a speed such that the tape 220 normally advances at a speed slightly in excess of the desired speed, for synchronous speed of motor 224. Motor 224 is then slowed, in response to control signals deriving from the control circuit 227, sufficiently to retard the speed of travel of the tape 220 to attain the desired synchronism.

Reference is now made to Figure 7 of the accompanying drawing, which shows the details of circuit arrangement of the control circuit 227, and the mode of associating same with the control amplifier 226 and the inverter 163, as well as the motor 224. Figure 7 of the drawings illustrates a hysteresis motor 224, comprising the usual rotor 230, and the usual field windings 231 and 232. The field winding 231 is connected directly across the output of the inverter 163, while the field winding 232 is oriented at right angles to the field winding 231 and is connected across the output of the inverter 163 via a phase shifting capacitor 233. There is, accordingly, established about the rotor 230 a rotating magnetic field, having a frequency equal to the frequency of output of the inverter 163, and which serves normally to rotate the rotor 230 at a corresponding synchronous frequency.

As is well known, the rotating fields established in a capacitive type hysteresis motor, are generally elliptical in shape, rather than circular, and the shape of the ellipse varies with the load on the rotor. Accordingly, a capacitive type hysteresis motor does not possess all the characteristics of the true synchronous motor, and especially does not possess the characteristic of operating either at synchronous frequency, or not at all, but is capable of variations of rotative speed in accordance with the load impressed thereon. This characteristic of the capacitor type hysteresis motor is taken advantage of in the present invention, by applying to the field winding 232, via the smoothing reactor 51, a small amount of D.-C. current, which serves as a brake or load varying effect, for causing the synchronous motor to slip back smoothly. The D.-C. control current established in the winding 232 is generated by applying the output of the inverter 163 between the anode 234 and the cathode 235 of a thyratron tube 236. In series with the anode 234 is provided a protective resistance 237, while across the anode-cathode circuit of the thyratron 236 is connected a variable resistance 238, the function of which in conjunction with the resistor 237 is to act as a voltage divider for determining the total anode-cathode voltage applied to the thyratron 236, and thereby adjusting the current through the thyratron 236 for any predetermined phase of the control signal.

A.-C. control voltage is applied between the control electrode and the cathode 235 of the thyratron 236, via the secondary winding 239 of a transformer 240, the secondary winding 239 being connected in series with a source of D.-C. bias potential 241. The control signal present on the slave tape 220 is translated by the reproducing head 225, and amplified in the control amplifier 26, the output of which is connected to the primary winding 242 of the transformer 240, and thence transferred to the control electrode-cathode circuit of the thyratron 236. As is well known, the average D.-C. current drawn by the thyratron 236 is a function of its average bias, as established by the adjustment of the bias source 241, as well as of the magnitude of the anode-cathode voltage and the grid-cathode voltage, and of the relative phases of the latter voltages. It is further well known that the thyratron 236 draws no anode current if the phases of the anode and grid voltages are such that the anode voltage never becomes positive while the grid voltage is simultaneously positive.

It will be recalled that the hysteresis motor 230 drives the slave tape 220 at a speed slightly greater than the speed required to establish synchronism between the slave and master tape. Accordingly, there is a continual variation of relative phase as between the voltage on the grid and the voltage on the anode of the thyratron 236, until equilibrium is established between the speed of travel of the tape 220, the drag established on the rotor 230 by the D.-C. current flow established by the thyratron 236, and the frequency applied to the rotor windings 231 and 232 of the rotor 224 by the inverter 163.

In the event the phase relationship of the voltages supplied by the anode 224 to the control electrode of the thyratron 236 are such that the anode goes positive while the grid is going negative, the thyratron will draw no current, and the rotor 224 will operate at excess speed, which will serve to drive the tape at excess speed, and thus to vary the phase of the voltage on the control electrode of the thyratron until some anode current does flow. This anode current in turn serves gradually to slow the speed of the rotor 224. The gradual slowing of the rotor 224 may be expected to continue, until eventually a proper phase relation is established on the control electrode of the thyratron 236. If the phase of the control voltage as provided by the transformer 240 advances to the point where excess current flows in the thyratron 236, the drag established on the rotor 224 will be such as to retard the speed of the tape 220 below that speed required for synchronization. This in turn will retard the phase of the voltage applied to the control electrode of the thyratron 236, and in turn enable increase of rotor speed by decreasing the anode current of the thyratron.

The net result will be that the rotor 230 will finally arrive at a speed such that the phase of the output of the inverter, as compared with the phase of the output of the control amplifier 236, is precisely that required to establish that anode current in the thyratron 236 which is required for maintenance of synchronization of the master and slave tapes.

While I have described various specific embodiments of my invention as well as various specific features important thereto, it will be clear that the general arrangement resorted to, the specific character of the various features thereof, and the various details of the organizations illustrated and described, may be departed from without departing from the true spirit and scope of my invention as defined in the appended claims.

What I claim and desire to secure by Letters Patent of the United States is:

1. In a system for recording on an elongated magnetic relatively wide tape a plurality of discrete recordings, a first toroidal sound recording head having a longitudinally extended relatively narrow record creating gap oriented with its length extending substantially laterally of said magnetic tape, and a second sound toroidal recording head having a longitudinally extended relatively narrow record creating gap oriented with its length substantially parallel to the length of said elongated magnetic tape.

2. In a system for recording a plurality of signals on a moving magnetic relatively wide receiving surface and for separately reproducing said signals, means for recording a first of said plurality of signals comprising a first toroidal recording head having an elongated and relatively narrow recording gap oriented with its length substantially perpendicular to the direction of movement of said receiving surface, means for recording another of said plurality of signals comprising a second toroidal recording head having an elongated and relatively narrow recording gap oriented with its length substantially parallel to the direction of movement of said receiving surface, and separate reproducing heads for separately reproducing only said first of said plurality of signals and only said another of said plurality of signals.

3. In a system for recording a pair of distinct signals in superposed relation on a single moving magnetic tape and for reproducing said signals selectively, means for recording a first of said pair of distinct signals on said single magnetic tape as variations of remanent magnetism distributed in a first orientation, and means for recording a second of said pair of distinct signals on said single magnetic tape as variations of remanent magnetism superposed over a portion of said first mentioned remanent magnetism and distributed in an orientation making a fixed predetermined angle with respect to said first orientation.

4. In a system for recording a pair of distinct signals in superposed relation on a single surface of a single magnetic tape and for erasing the recordings, means for recording a first of said pair of distinct signals on said single surface of said single magnetic tape as variations of remanent magnetism distributed in a first orientation, means for recording a second of said pair of distinct signals on said single surface of said single magnetic tape as variations of remanent magnetism superposed over a portion of said first mentioned flux and distributed in an orientation making a single fixed predetermined angle with respect to said first orientation, and means comprising a single erasing head for simultaneously erasing both variations of bound magnet flux.

5. In a system for recording a pair of distinct signals in superposed relation on a single moving magnetic tape and for simultaneously erasing said recordings, means for recording a first of said pair of distinct signals on said single magnetic tape as variations of remanent magnetism distributed in a first orientation perpendicular to the movement of said tape, means for recording a second of said pair of distinct signals on said single magnetic tape as variations of remanent magnetism superposed only partially on said first mentioned magnetic flux and distributed in an orientation making only a single fixed predetermined angle of 90° with respect to said first orientation, and an erasing head for erasing simultaneously both said variations of bound magnetic flux, said erasing head comprising an erasing gap oriented at an angle greater than zero simultaneously with respect to both said orientations.

6. In a system for recording on a magnetic tape, means for recording a first record magnetically on said magnetic tape, means for recording a further record on said magnetic tape as two discrete recordings, said two discrete recordings comprised of oppositely directed bound magnetic fluxes of substantially equal magnitudes, a reproducing head for reproducing said first record, said reproducing head comprising means responsive to said two discrete recordings to generate substantially two signals of opposite phase and of equal amplitude.

7. In a system for recording and reproducing, a magnetic tape, means for recording a first record magnetically on said magnetic tape, means for recording a further record on said magnetic tape as two discrete recordings, said two discrete recordings comprised respectively of oppositely directed remanent magnetic fluxes of substantially equal magnitudes, first reproducing means for providing a reproduction of said first record, said first reproducing means comprising means for balancing out in said reproduction the response of said first reproducing means to said two discrete recordings, a second reproducing means for said further record, said second reproducing means comprising means responsive additively to said two discrete recordings while substantially eliminating the response of said second reproducing means to said first recording.

8. In a system for magnetic recording on a single flat surface of an elongated flat magnetic tape a plurality of discrete and separately reproducible recordings, a first sound recording head having a longitudinally extended relatively narrow uniform record creating gap oriented with the longitudinal dimension of said gap extending longitudinally entirely of said tape and in superposition of said single surface only, and a second sound recording head having a longitudinally extended relatively narrow record creating gap oriented with the longitudinal dimension of said last mentioned gap extending transversely of said single surface and superposed over said single surface only.

9. The combination in accordance with claim 8 wherein is further provided means comprising only a single erasing head for erasing both said recordings.

10. The combination in accordance with claim 1 wherein said second toroidal record creating gap possesses length less than one-half the distance traveled by said tape in recording one cycle of the lowest frequency recorded by said second toroidal sound recording head.

11. The combination in accordance with claim 1 wherein said second toroidal sound recording head comprises a pair of adjacent magnetic poles separated by said last mentioned record creating gap, the width of said last mentioned gap between said poles being less than 5 mils and the length of said last mentioned gap being less than half the distance traveled by said tape in one cycle of the lowest frequency recorded by said last mentioned gap.

12. The combination in accordance with claim 2 wherein said second recording gap is less than five mils wide and less than 250 mils long.

13. The combination in accordance with claim 3 wherein said recording heads are toroidal recording heads.

14. The combination in accordance with claim 3 wherein said fixed predetermined angle is parallel with the direction of movement of said magnetic tape, and wherein said second mentioned means includes a toroidal recording head having a gap of less than five mils wide and a length less than half the distance traveled by said tape in one cycle of the lowest recorded frequency.

15. The combination in accordance with claim 4 wherein said second mentioned means for recording includes a toroidal recording head having a gap the longest dimension of which is parallel to the length of said tape, said longest dimension less than one-half the distance traveled by said tape in one angle of the lowest frequency recorded by said second mentioned means for recording.

16. The combination in accordance with claim 5 wherein said means for recording a second of said pair of distinct signals is a toroidal recording head having a length of gap less than one-half the distance traveled by said tape in one cycle of the lowest frequency recorded by said means for recording a second of said pair of distinct signals.

17. The combination in accordance with claim 6 wherein said two discrete recordings are comprised of oppositely directed fluxes directed longitudinally of said magnetic tape.

18. In a system for recording on an elongated magnetic tape a plurality of discrete recordings, which may be reproduced without intermodulation, a first sound recording head having a longitudinally extended record creating gap oriented with its length extending substantially laterally of said magnetic tape, and a second sound recording head having a longitudinally extended record creating gap having its width in a direction transversely of said tape, said width less than five mils, and the length of said longitudinally extended record creating gap less than 250 mils, the length of said last mentioned gap oriented substantially parallel to the length of said elongated magnetic tape.

19. In a system for recording a plurality of discrete recordings on a magnetic tape, a first sound recording head for recording on said tape, said first sound recording head having a pair of first magnetic poles separated in the direction of travel of said tape, a second sound recording head for recording on said tape in superposition of the recording made by said first recording head, said second recording head comprising at least one pair of second magnetic poles separated perpendicularly to the direction of travel of said tape, said second magnetic poles separated by a distance of less than five mils and having each a length parallel to the direction of travel of said tape equal to less than one-half the distance said tape travels during one cycle of the lowest frequency recorded by said second recording head.

20. Recording apparatus for recording a pair of signals on a single record medium comprising, a pair of recording elements, means for energizing said elements from a first signal source in reverse polarity relation to produce on said medium a pair of identical opposite polarity records of the first signal, a third recording element, and means for energizing said third recording element from a second signal source to produce on said medium a single record of the second signal.

References Cited in the file of this patent

UNITED STATES PATENTS

| Number | Name | Date |
|---|---|---|
| 900,304 | Pedersen | Oct. 6, 1908 |
| 1,859,665 | Golden | May 24, 1932 |
| 1,935,431 | Bedford | Nov. 14, 1933 |
| 1,935,464 | Willis | Nov. 14, 1933 |
| 1,939,432 | Bedford | Dec. 12, 1933 |
| 2,092,024 | Rowe | Sept. 7, 1937 |
| 2,103,766 | Cahill | Dec. 28, 1937 |
| 2,272,821 | Roys | Feb. 10, 1942 |
| 2,305,581 | Homrighous | Dec. 15, 1942 |
| 2,469,750 | Sunstein | May 10, 1949 |
| 2,484,568 | Howell | Oct. 11, 1949 |
| 2,496,047 | Goddard | Jan. 31, 1950 |
| 2,538,892 | Begun | Jan. 23, 1951 |

FOREIGN PATENTS

| Number | Country | Date |
|---|---|---|
| 587,916 | Germany | Nov. 10, 1933 |
| 594,991 | Germany | Mar. 24, 1934 |
| 612,489 | Germany | Apr. 25, 1935 |
| 805,434 | France | Aug. 22, 1936 |